United States Patent
McColgan

(10) Patent No.: US 10,197,422 B2
(45) Date of Patent: Feb. 5, 2019

(54) SYSTEM AND METHODS FOR INTERACTING WITH A SMART TOOL

(71) Applicant: BlackBerry Limited, Waterloo, Ontario (CA)

(72) Inventor: Brian Edward Anthony McColgan, Mississauga (CA)

(73) Assignee: BlackBerry Limited, Waterloo, Ontario (CA)

(*) Notice: Subject to any disclaimer, the term of this patent is extended or adjusted under 35 U.S.C. 154(b) by 298 days.

(21) Appl. No.: 14/433,450

(22) PCT Filed: Oct. 5, 2012

(86) PCT No.: PCT/CA2012/050707
§ 371 (c)(1),
(2) Date: Apr. 3, 2015

(87) PCT Pub. No.: WO2014/053048
PCT Pub. Date: Apr. 10, 2014

(65) Prior Publication Data
US 2015/0247745 A1    Sep. 3, 2015

(51) Int. Cl.
*G01D 7/00* (2006.01)
*B25B 23/142* (2006.01)
*G01M 99/00* (2011.01)

(52) U.S. Cl.
CPC ........... *G01D 7/00* (2013.01); *B25B 23/1422* (2013.01); *B25B 23/1425* (2013.01); *G01D 7/002* (2013.01); *G01M 99/00* (2013.01)

(58) Field of Classification Search
CPC ........................................... G01D 7/00
See application file for complete search history.

(56) References Cited

U.S. PATENT DOCUMENTS

| 7,143,844 | B2 | 12/2006 | Alft et al. |
| 8,033,181 | B2* | 10/2011 | Kibblewhite ........... G01L 1/255 73/761 |
| 2002/0033267 | A1* | 3/2002 | Schweizer .............. B25B 23/14 173/2 |
| 2004/0073279 | A1 | 4/2004 | Malackowski et al. |
| 2006/0142894 | A1* | 6/2006 | Tsuchiya .............. B23D 59/008 700/180 |
| 2009/0234490 | A1 | 9/2009 | Suprock et al. |

(Continued)

OTHER PUBLICATIONS

International Search Report and Written Opinion dated Mar. 19, 2013, received for PCT Application No. PCT/CA2012/050707.

*Primary Examiner* — Matthew G Marini
(74) *Attorney, Agent, or Firm* — Jeffrey N. Giunta; Fleit Gibbons Gutman Bongini & Bianco P.L.

(57) ABSTRACT

A system and method performed by the system comprising obtaining a work parameter measured by a smart tool connected to an electronic device; and displaying information associated with the work parameter on a display of the electronic device. A system and method perform by the system comprises measuring a work parameter associated with a smart tool operating on a workpiece; and sending the work parameter to an electronic device connected to the smart tool to enable the electronic device to display information associated with the work parameter on a display of the electronic device.

14 Claims, 12 Drawing Sheets

(56) References Cited

U.S. PATENT DOCUMENTS

| | | | | |
|---|---|---|---|---|
| 2011/0113613 A1* | 5/2011 | Gamboa | ............ | G05B 19/4183 |
| | | | | 29/525.01 |
| 2013/0047408 A1* | 2/2013 | Kibblewhite | ......... | B25B 21/002 |
| | | | | 29/525.01 |

* cited by examiner

SYSTEM AND METHODS FOR INTERACTING WITH A SMART TOOL

TECHNICAL FIELD

The following relates to systems and methods for interacting with smart tools.

DESCRIPTION OF THE RELATED ART

Tools, both hand tools and power tools may include an ability to sense and provide information associated with operation it is performing. For example, electronic torque wrenches exist that can report the current torque being applied to the workpiece being worked on by the tool.

Although tools may be capable of providing feedback including such information, the information being reported may be limited by the output devices of the tool, and often requires the knowledge, skill and expertise of the operator in order to have any meaning or use.

BRIEF DESCRIPTION OF THE DRAWINGS

Embodiments will now be described by way of example only with reference to the appended drawings wherein.

DETAILED DESCRIPTION

Figure 1:
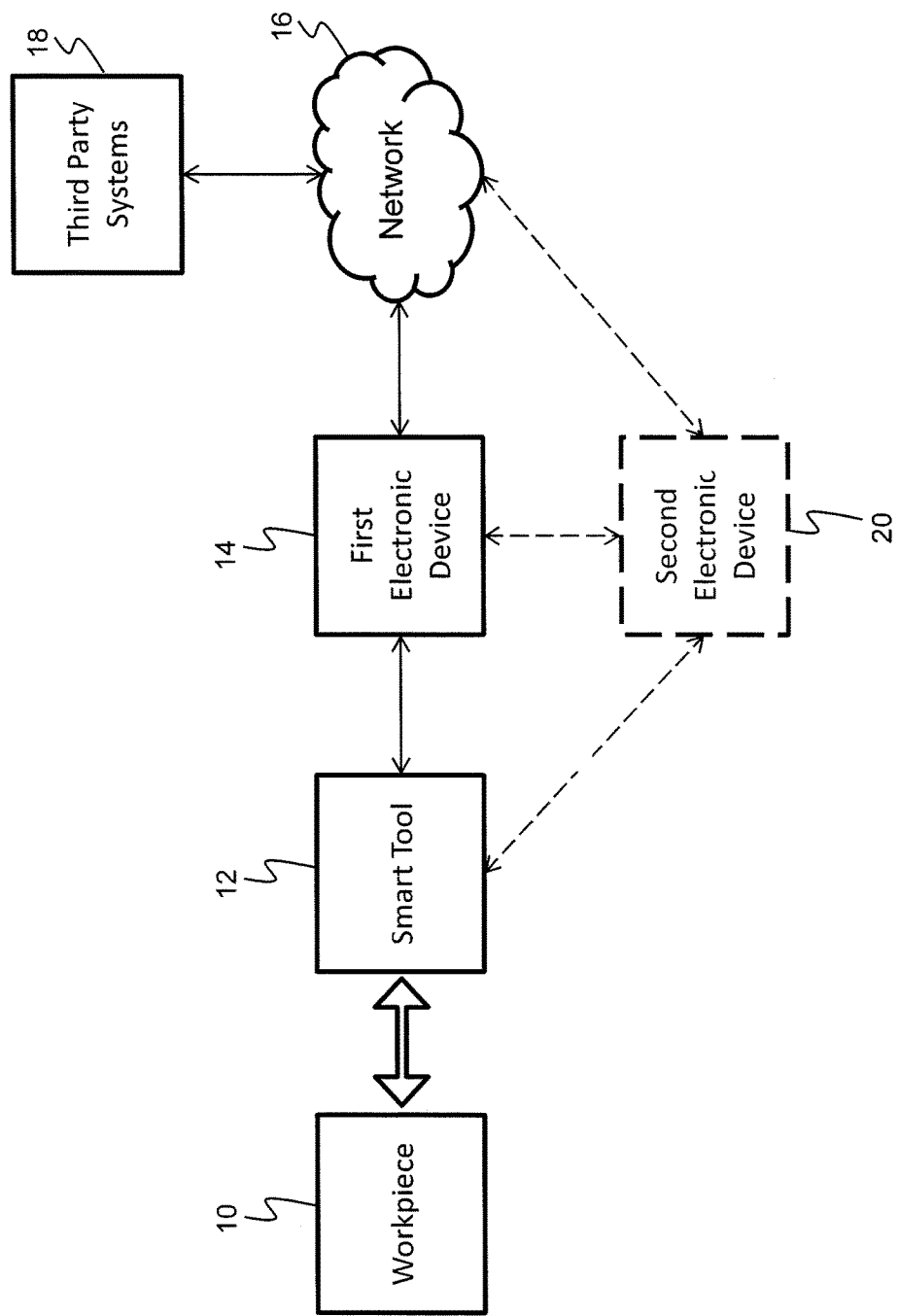
FIG. 1 is an example block diagram illustrating a system for interacting with a smart tool.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In an example, a smart tool may be configured to communicate with an external electronic device such as a smart phone, tablet computer, laptop computer, or other handheld devices; and the electronic device configured to provide an application for interacting with the smart tool. By enabling a smart tool and electronic device to interact with each other, not only can use of the tool be enhanced, but the smart tool can also provide such functionality with minimal output devices, by leveraging the capabilities of the electronic device. Moreover, the absence of output devices on the smart tool can reduce damage to the output devices during use of the smart tool and minimize battery drain and processor usage required to perform the "smart" operations.

By enabling an electronic device to interact with a smart tool, the communication and processing capabilities of the electronic device can be leveraged, e.g., to obtain additional information such as specifications and instructions from third party systems accessible over a network. Moreover, pairing or "tethering" the electronic device with other electronic devices enables additional input and output mechanisms to be used to interact with the smart tool, e.g., larger displays, touch screens, data communication interfaces, as well as access to software applications not available to the smart tool or first electronic device.

Turning to FIG. 1, a smart tool 12 is shown, which is in mechanical or electrical contact with a workpiece 10 in order to perform work on the work piece 10. For example, the smart tool 12 may include a wrench that is in mechanical contact with a workpiece 10 including a bolt. Similarly, the smart tool 12 may include a battery charger in electrical contact with a workpiece 10 including a battery. The smart tool 12 in the example shown in FIG. 1 is in communication with a first electronic device 14. The first electronic device 14 may be, for example a smart phone, tablet computer, or other handheld or "mobile" device. The first electronic device 14 in this example is also in communication with a network 16, which is accessible to one or more third party systems 18 to enable the first electronic device 14 to communicate with the third party systems via the network 16.

The network 16 may include local or wide area networks, accessible via various communications interfaces, e.g., cellular, WiFi, Ethernet, etc. The third party system 18 may include, for example, web sites, databases, applications, and other electronic devices or servers. The third party system 18 may also include manufacturer databases, third-party applications, and other systems maintained by a third party. In one example embodiment, the third party system 18 includes any one or more of: a Universal Product Code (UPC) database, a manufacturer technical support system, an optical recognition system, and a technical manuals database.

As illustrated in dashed lines in FIG. 1, the first electronic device 14 may also be in communication with a second electronic device 20, such as a mobile device, desktop computer, television screen, kiosk, etc. The second electronic device 20 may also be capable of communicating with directly with the smart tool 12 and/or the network 16 in various example embodiments. Although not explicitly shown in FIG. 1, it can be appreciated that the smart tool 12 may also be capable of communicating directly with the network 16 and therefore the electronic devices 14, 20, if available may be used selectively to enhance interactivity or complement data accessibility to the third party systems 18 in some example embodiments. It can also be appreciated that smart tool 12 may utilize any available electronic device 14, 20 in a particular environment and/or scenario such that a particular configuration is not required each and every time the smart tool's interactivity is to be enhanced.

Figure 2:
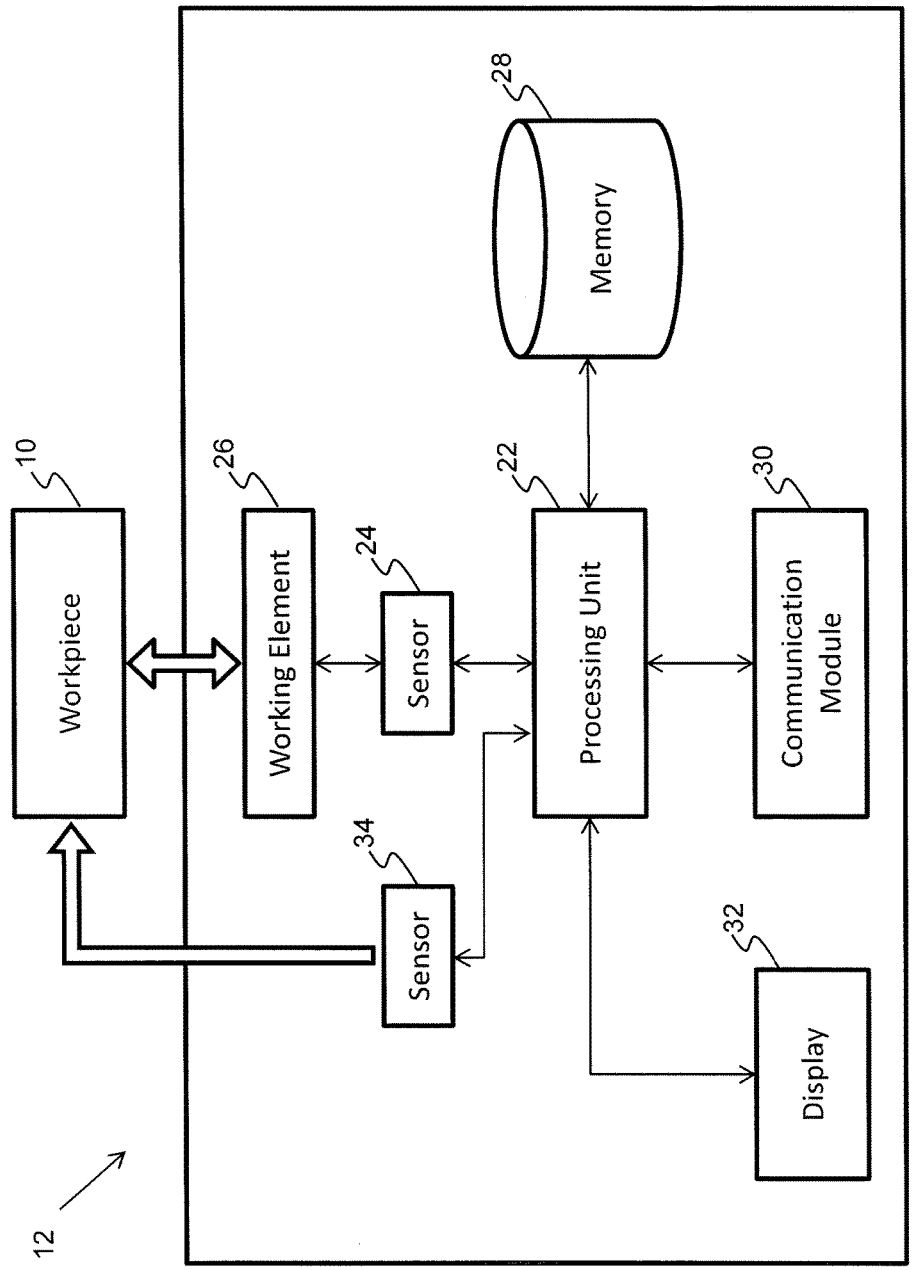
FIG. 2 is a block diagram illustrating an example of a configuration for a smart tool.

FIG. 2 is a block diagram showing an example of a configuration for the smart tool 12. The smart tool 12 in this example embodiment includes a processing unit 22 for interacting with at least one sensor 24 that is configured to sense or otherwise detect operation of a working element 26 on the workpiece 26. For example, a torque sensor may read the torque being applied by a wrench head that is working on a nut or bolt or a voltmeter may read a voltage of a battery or electronic circuit. The processing unit 22 may include or otherwise have access to a memory 28 for storing data readings, instructions for operating a sensor 24 and/or working element, or any other data, information, and computer executable program instruction used by the smart tool 12. The processing unit 22 is also operable to utilize a communication module 30 for communicating with an external entity such as the first and second electronic devices 14, 20, the network 16, etc. The smart tool 12 in this example embodiment also includes a display 32. The display 32 may be used to display information related to the current status of the smart tool 12, e.g., a battery status, a work parameter (e.g., torque, pressure, voltage), a communication status (e.g., Bluetooth connection, wireless connectivity, etc.). The memory 28 may be a persistent storage such as a flash memory, or a random access memory (RAM), or any other type of storage element. The communication module 30 may be enabled to communicate with external entities using wired or wireless communication methods, for example, via a Universal Serial Bus (USB), WiFi, Bluetooth, 3G, or any other suitable connection scheme. One or more additional sensors 34 may also be used by the smart tool 12 for interacting with the workpiece 10, e.g., an imaging sensor, barcode scanner, etc.

Figure 3:
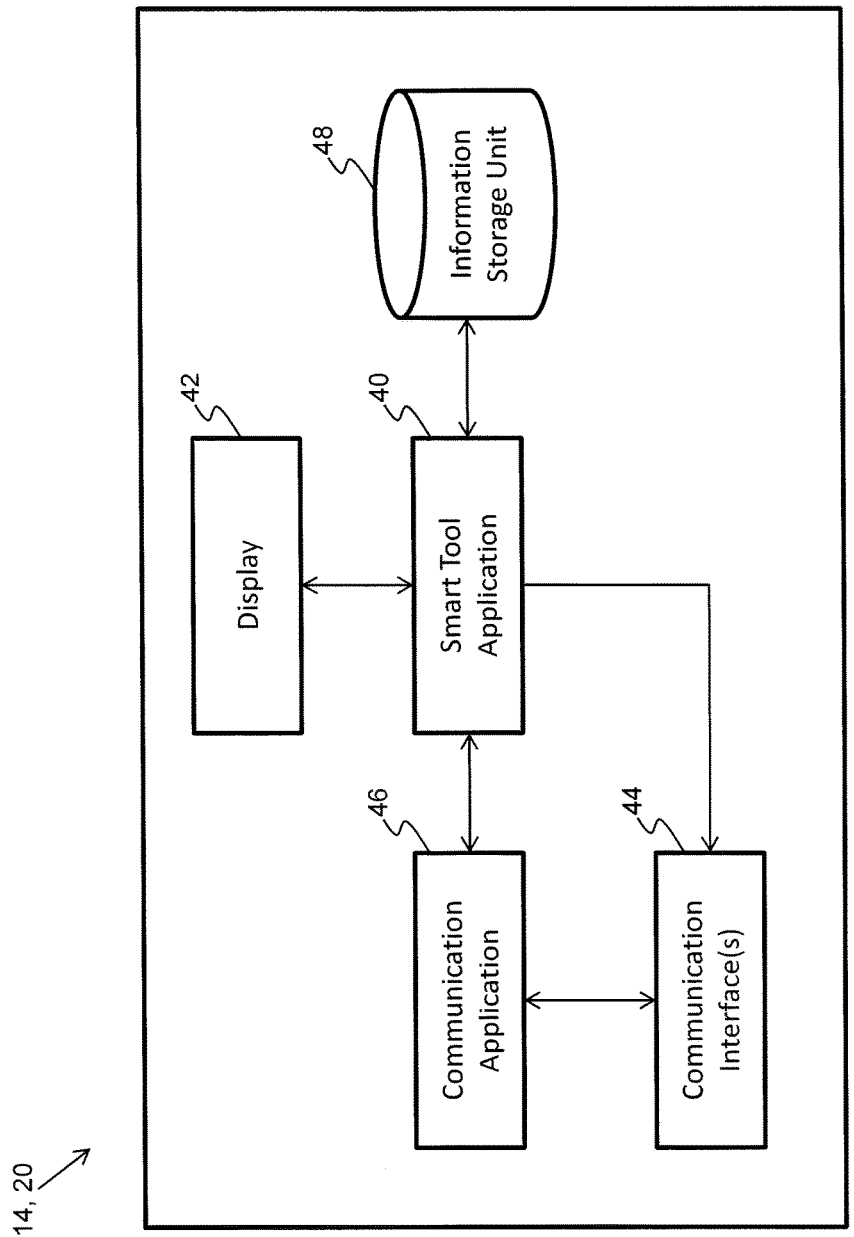
FIG. 3 is a block diagram illustrating an example of a configuration for an electronic device operable to communicate with a smart tool.

FIG. 3 illustrates an example of a configuration for the first or second electronic device 14, 20. It can be appreciated that various components of and/or used by the electronic devices 14, 20 have been omitted from FIG. 3 for ease of illustration, e.g., internal processors, communication buses, other applications and components, etc. (see FIG. 12 for a detailed example embodiment of an electronic device). The electronic device 14, 20 in this example includes a smart tool application 40 configured to interact with the smart tool 12 by communicating with the smart tool 12 via a communication interface 44. The smart tool application 40 may also use a communication interface 44 to access data and information from a third party system 18 over the network 16. The smart tool application 40 may include or otherwise have access to an information storage unit 48 or other memory to store or cache data received from the smart tool 12 or third party system 18. The smart tool application 40 may be capable of communicating directly with the network 16, or may be configured to utilize a communication application 46 to provide access to the network. For example, a web browser may be used to download a specification manual on behalf of the smart tool application 40. The electronic device 14, 20 in this example also includes a display 42 for displaying information associated with interactions with the smart tool 12. For example, the display 42 may be used to show a battery status of the smart tool 12, one or more work parameters, a communication status, a document or application related to operation of the smart tool 12, etc. The display 42 can also be used to show a user interface, a message alert, or any information received from the network 16 and/or a third party system. It can be appreciated that a plurality of smart tool applications 40 may be used by the electronic device 14, 20. For example, individual applications or applets may be available for individual smart tool types. Also, a single smart tool application 40 may be capable of interacting with multiple smart tool types.

A smart tool application 40 can be, in general, enabled to perform any function related to the operation of the smart tool 12, and to access and store data and instructions to/from the information storage unit 48. The smart tool application 40 may, for example, manage the user interface displayed by the electronic device 14, 20, maintain a library of saved items related to the smart tool 12, and access any other software or hardware modules residing on the electronic device 14, 20 that may be used for processing information received from the smart tool 12, the network 16, or a third party system 18. The communication application 46 can be leveraged to add communication capabilities to the smart tool application 40. For example, the communication application 46 may be used to relay information received from an external source (e.g., network 16, smart tool 12, third party system 18) via a communication interface 44 to the smart tool application 40, and vice versa. The communication interface 44 used in this manner is configured to establish and maintain communication with the smart tool 12 using any of the previously mentioned methods for communication. The communication interface 44 being used may also support both standardized or proprietary communication protocols when communicating with the network 16, e.g., Hypertext Transport Protocol (HTTP) 1.1, Session Initiation Protocol (SIP), Simple Network Management Protocol (SNMP), etc.

Figure 4:
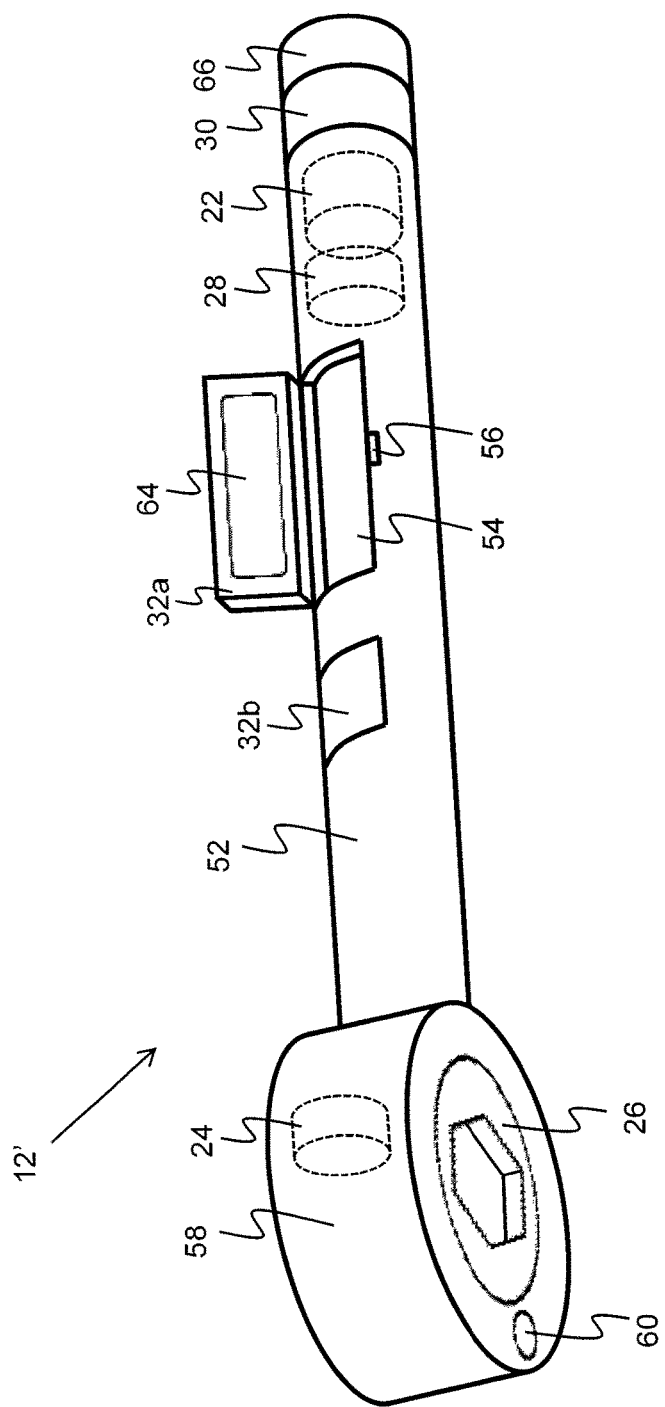
FIG. 4 is a perspective view of a torque wrench smart tool.

FIG. 4 illustrates a perspective view of a smart torque wrench 12'. The smart torque wrench 12' in this example includes a handle 52 connected to a wrench head 58 containing a socket head working element 26. The handle 52 contains a socket sensor 24 for detecting the torque applied by the socket head working element 26, a processing unit 22, a memory 28, a communication module 30 for communicating with, for example, an electronic device 14, 20, and an optional externally accessible communication port 66, e.g., a USB port. In this example, the smart torque wrench 12' provides a first, flip-up display 32a, and a second, embedded and "always visible" display 32b. The flip up display 32a includes a relatively larger screen 64 than the second display 32b and may be used to display more detailed information while the second display 32b provides more compact "status" information. The wrench head 58 in this example includes an optical sensing module 60, e.g., a barcode scanner, camera, etc. The optical sensing module 60 may include one or more additional sensors 34 as described above.

In operation, an operator would grip the handle 52, interface the working element 26 with the workpiece 10 (e.g., a nut or bolt head in this example), and rotate the handle 52 relative to the workpiece 12 to torque the workpiece 12. It can be appreciated that the example shown in FIG. 4 is illustrative only, for example, the handle 52 may take on any shape or form such as the gripping element of an impact driver. In other example embodiments, the handle 52 may support a strap (e.g., a Velcro strap) or other type of flexible connector that the operator may affix around their working hand or onto a portion of the operator's clothing (e.g., a belt). This would permit the operator to quickly retrieve the smart tool 12 or have it available in their working hand for quick reference or use.

The socket head working element 26 shown in FIG. 4 is a hexagonal recess for engaging a hexagonal nut, however, this is illustrative only. For example, the working element 26 include a screwdriver head, a hammer head, a nozzle, a ratcheting connector, or any other type of working element 26 that may interact directly or indirectly with the workpiece 10. The working element 12 may be located at any suitable location on the smart tool 12 as dictated by its function, e.g., at the center of, or near the extremities of the handle 52, etc. However, in some example embodiments, the working element 26 may be placed anywhere along the handle 52 in any configuration. In one example embodiment, the working element 26 is interchangeable or reconfigurable, such that the operator may change or modify the working element 26 depending on the task. For example, a socket wrench may be capable of using different sized sockets, e.g., such that a ⅜" socket is swapped with a ½" socket.

In another example embodiment, the smart tool 12 may also include an electro-mechanical module such as a motor. The electro-mechanical module may be embedded within the body of the smart tool 12, be part of the working element 26, or may be attached externally to the body of the smart tool 12 or the working element 26, to name a few examples. For example, a rotating attachment which permits a drill bit or other boring device to be inserted and applied to the workpiece 10 by the smart tool 12.

The working element sensor 24 is a sensor 24 that detects at least one parameter associated with the working element 26 which is interacting with the workpiece 10. The sensor 24 is operatively coupled to at least the working element 26 and the processing unit 22. In one example embodiment, the sensor 24 may be able to not only detect, but continuously (or periodically) monitor and modulate at least one work parameter by communicating with the processing unit 22. In the example embodiment shown in FIG. 4, the sensor 24 is, or includes, a torque sensor enabled to detect the amount of torque being applied by the smart tool 12. The torque values detected by the torque sensor 24 are communicated to the processing unit 22, which may store the values in the memory 28. In another example embodiment, the sensor 24 may be integrated with a smart tool application 40 to be executed by the processing unit 22, e.g., to display torque values on the flip-up display 32a for the operator.

The flip-up display 32a may be integrated onto the handle 52 of the smart tool 12 as shown in FIG. 4, or a removable display may be used (not shown). In one example embodiment, the flip-up display 32a is attached to the smart tool 12' by a hinge, such that the flip-up display 32a folds out of the smart tool 12'.

The communication module 30 and, if applicable, the communication port 66, enable the smart tool 12 to communicate with the electronic device 14, 20 or network 16. In one example embodiment, the communication module 30 provides a USB port 66 for connecting via a USB cable. In another example embodiment, the communication module 30 supports a wireless communication protocol (e.g. using Bluetooth, WiFi, or 3G wireless connections). It will be understood that other methods of providing a connection between the smart tool and the external device may also be used. It can also be appreciated that the communication module 30 may be configured to provide both wired and wireless communication capabilities.

The optical sensing module 60 may include any one or more of a camera, a barcode or Quick Response (QR) code scanner. The optical sensing module 60 captures information related to the workpiece 10, such as the shape, size, symbols, or markings present on the workpiece 10, an image of the workpiece itself, or a barcode or QR code associated with the workpiece 10. In one example embodiment, the optical sensing module 60 is, or includes, a camera that enables the user to obtain a real-time video feed or a still image of the workpiece 10. The optical sensing module 60 may also include, for example, an infra-red camera or a lighting element such as a LED for working in a low-light environments.

The smart tool 12 may also include a power module (not shown), wherein at least a portion of the power module may be integrated with the communication module 30, such that power can be supplied to the smart tool 12 when a communication link that supports power transfer is available. In one example embodiment, the power module includes a connection port for drawing power from an external power supply such as a wall socket. In another example embodiment, the power module further includes a battery for storing a charge. The battery may be rechargeable, and may be integrated into the smart tool 12 or may be externally attached to the power module.

The second display 32b may be used to display selective information that is also being displayed on the first display 32a. For example, the second display 32b may show the battery status, the current work parameter, and the communication status. Alternatively, the second display 32b may display additional information that is not being shown on the first display 32a.

Figure 5:
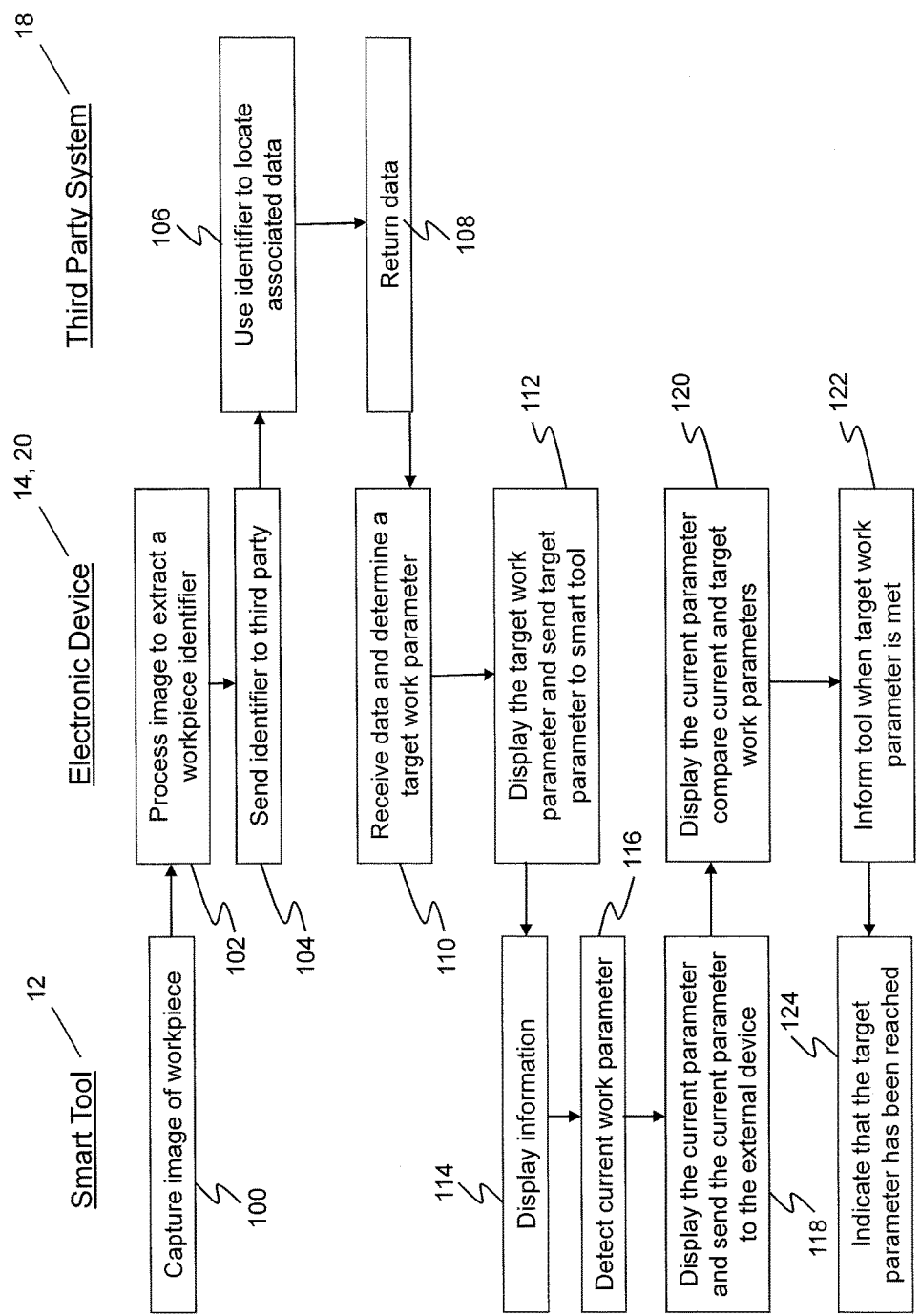
FIG. 5 is flow chart illustrating computer executable operations that may be performed in interacting with a smart tool and a third party system.

FIG. 5 is a flow diagram illustrating computer executable operations and/or processor implemented that may be performed in using an electronic device 14, 20 connected to a smart tool 12, and a third party system, to assist in using the smart tool 12. An image of the workpiece 10 is captured at 100, e.g., using the optical sensing module 60, which is transmitted to the electronic device 14, 20, e.g., to be used by an associated smart tool application 40 residing on the electronic device 14, 20. A workpiece identifier such as for example a UPC barcode, part number or serial number, is extracted by the electronic device 14, 20 at 102 and the identifier is sent to a third party system 18 at 104, in order to have the third party system locate associated information in a database storing manufacturer specifications related to the work piece 10. (In another example embodiment, the electronic device 14, 20 obtains the work piece identifier from another source, such as from a user entering a part number or serial number of the work piece into the electronic device.)

After locating the relevant information related to the identifier the data is returned to the electronic device 14, 20 at 108, e.g., to be used by the smart tool application 40. The electronic device 14, 20 in this example receives the data at 110 and determines a target work parameter relevant to operating on the workpiece 10, e.g. a torque setting. The target work parameter is sent to the smart tool 12 to enable the smart tool 12 to process and use the target work parameter. For example, in FIG. 5, the smart tool 12 displays the received target work parameter and/or related information at 114.

A current work parameter is detected by the working element sensor 24 at 116 to enable the target working parameter to be compared to the current situation. The current work parameter may be displayed by the smart tool 12 at 118 as shown in FIG. 5, and the current parameter sent to the electronic device, e.g., to be used by the smart tool application 40. The smart tool application 40 displays the current parameter on the electronic device 14, 20, and compares the current work parameter to the target work parameter at 120. The smart tool application 40 in this example informs the smart tool 12 once the target work parameter has been met at 122, allowing the smart tool 12 to indicate that the target parameter has been met at 124. It can be appreciated that the electronic device could also be used to provide an indication of when the target parameter has been met, e.g., when the smart tool 12 is being operated remotely from the electronic device.

In another example embodiment, the comparison of current and target work parameters can be performed by the processing unit 22 of the smart tool 12.

The manufacturer specifications can be provided using a "smart manual" enabled to interact with the smart tool application 40 residing on the electronic device 14, 20. By interacting with the smart manual, the smart tool application 40 can automatically locate the relevant information, and extract the necessary data from the smart manual on behalf of the operator. In another example embodiment, the operator may bookmark frequently referenced sections of the saved technical manuals for future access. The smart manual may also include a software library or software plugin that is designed to execute or be invoked by the smart tool application 40, e.g., using a predefined library Application Programming Interface (API) or other data structure or mechanism. In this way, the smart tool 12 can dynamically apply the most current and correct steps on behalf of the operator.

Figure 6:
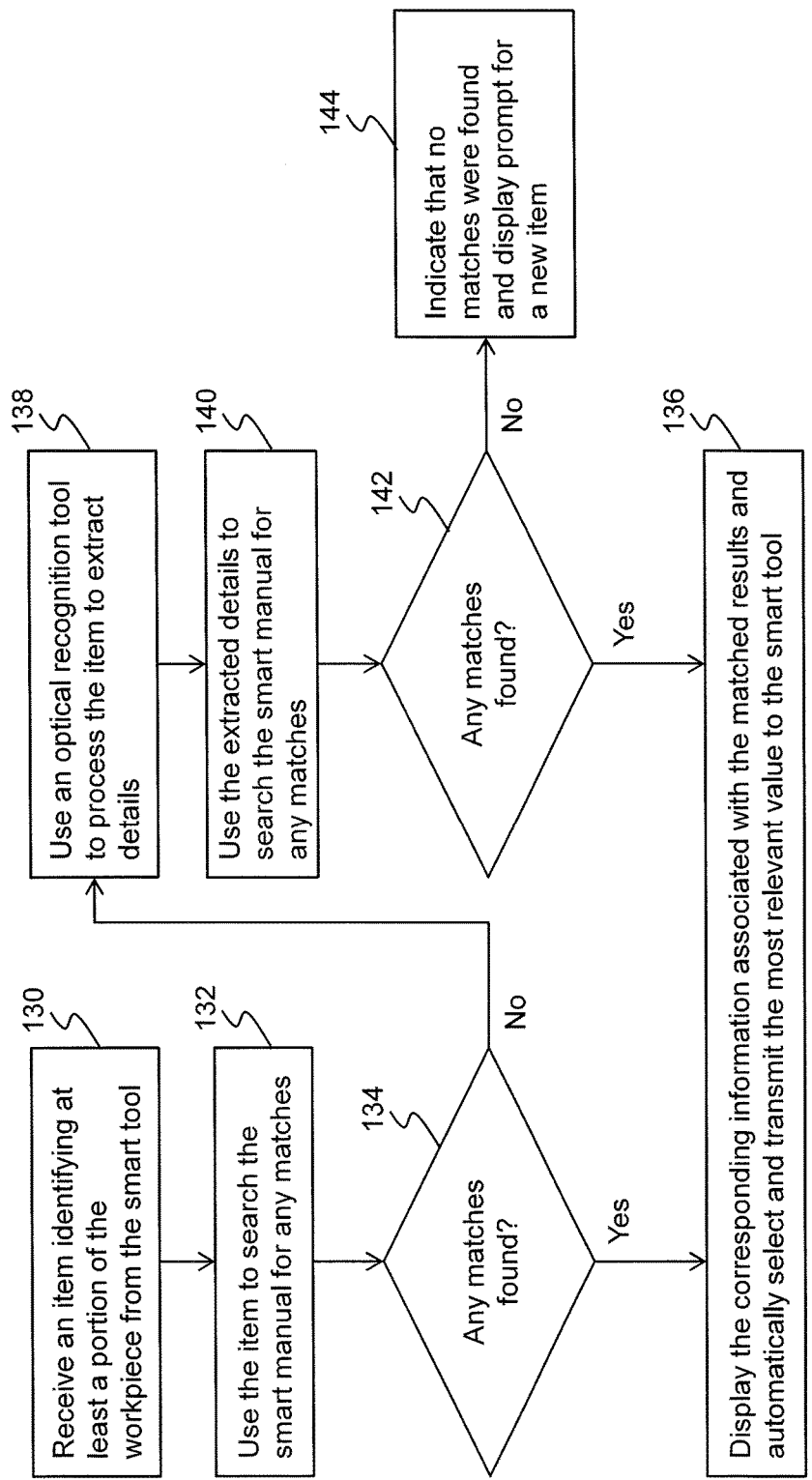
FIG. 6 flow chart illustrating computer executable operations that may be performed in determining the identity of a workpiece.

FIG. 6 illustrates example computer executable and/or processor implemented operations that may be performed by the smart tool application 40 in identifying a workpiece 10. The smart tool application 40 receives an item at 130, such as a still image or a video clip showing at least a portion of the workpiece 10 from the smart tool 12 or from an imaging device to, or included in, the electronic device 14, 20. The item is used at 132 to search for an element within an available smart manual that corresponds or matches the item. The smart tool application 40 determines at 134 whether or not a match has been found. If a match is found, the corresponding information is displayed at 136, and the most relevant value associated with the element may be transmitted to the smart tool 12.

If a match is not found at 134, the smart tool application 40 may process the item using an optical recognition tool at 138 to extract any information that may help identify the workpiece 10. The optical recognition tool may reside on the electronic device 14, 20, or may be accessed over the network 16. The information extracted may include characters such as part numbers or serial numbers, contour of the workpiece 10, or any other information that may be unique to the workpiece 10. The smart tool application 40 then re-executes the search using the extracted details at 140 and determines at 142 whether matches have been found using the extracted details. If no matches are found at 142, the smart tool application 40 may indicate that no matches are found at 144, e.g. by displaying a prompt to provide a new item (e.g., take another image), or to retry the search (e.g. using a manually entered keyword 'GM master cylinder'). If a match is found at 142, the corresponding information is displayed at 136, and the most relevant value associated with the element may be transmitted to the smart tool 12.

It can be appreciated that other example embodiments for using a smart manual exist. For example, in a software plugin scenario, an interface may be used (e.g., with the optical sensor 60) to automatically identify the workpiece 10 (e.g., using a QR code). As a result, the smart tool 12 can invoke the 'plugged in' software module (or invoke a specific QR code dependent RESTful link or API-call) which then executes or steps through a specific set of instructions (e.g., a component or identified workpiece specific procedure). The smart tool 12 can also utilize or provide workpiece-specific measurements or indicators on a smart tool display 32a, 32b, or store these measurements in the memory 28. Workpiece specific measurement and indicators may include readings to expect on the smart tool 12 (e.g., "the next torque setting is 20 ft-lbs"). In other example embodiments the indicators may be instructional steps, e.g., "place smart tool onto workpiece at bolt #3, and tighten until the audible click is heard/felt in the smart tool".

Figure 7:
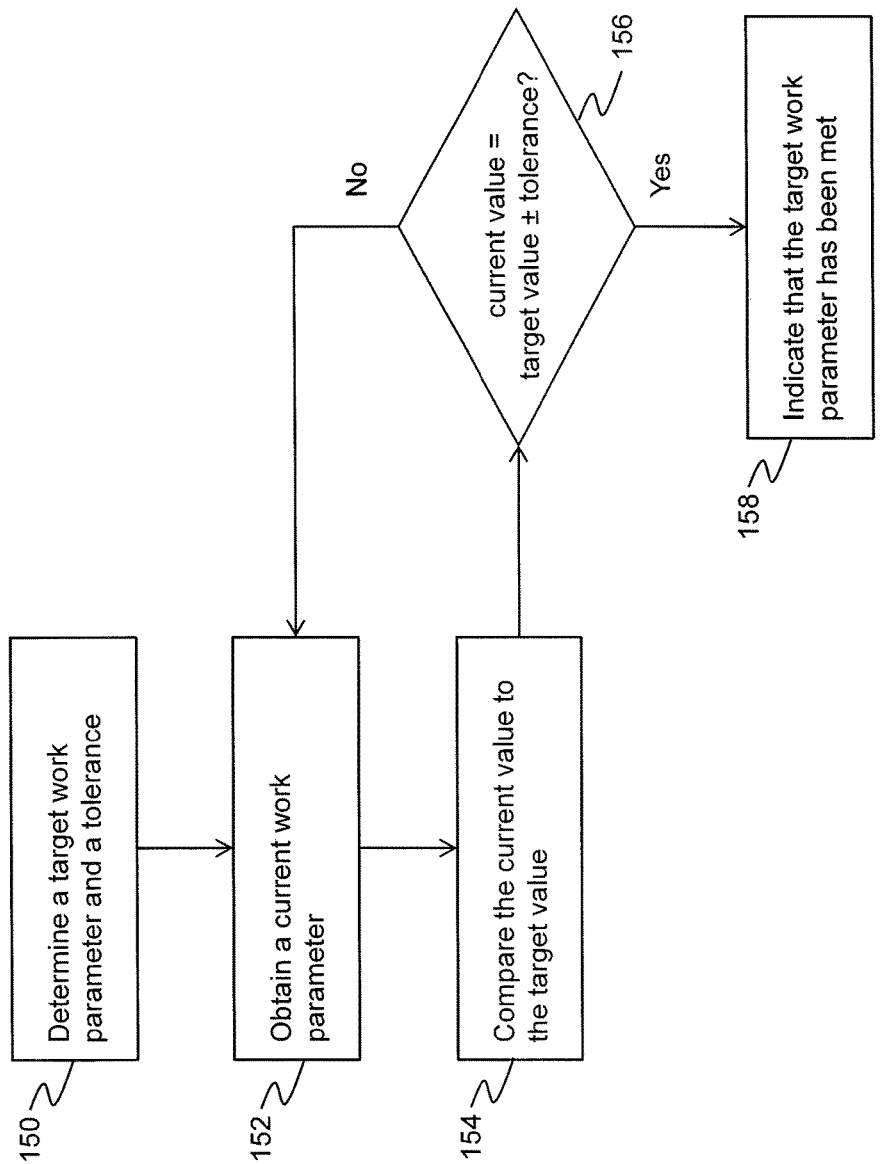
FIG. 7 flow chart illustrating computer executable operations that may be performed in determining when a target work parameter has been achieved.

FIG. 7 illustrates example computer executable and/or processor implemented operations that may be performed in determining when a target work parameter has been met. In this example, the target work parameter and a tolerance are determined at 150, e.g., by user input or by automatic selection/identification by the smart tool application 40. A current work parameter is obtained by the work element sensor 24 at 152, and the current work parameter is compared to the target work parameter at 154 in order to determine if the current work parameter is equal to the target work parameter. Where a tolerance is used, the smart tool application 40 determines at 156 if the current work parameter is within the tolerance of the target work parameter and to be able to conclude that the current work parameter is sufficiently close to the target work parameter. If the current value is equivalent to the target, within the specified tolerance, smart tool application 40 indicates that the target work parameter has been met at 158. If the current work parameter does not fall within the tolerance, the current work parameter is updated, and the updated value is compared to the target work parameter at 152 and 154 and the determination at 156 repeated.

To illustrate the comparison of current work parameters and target work parameters, an example will now be provided. In this example, the work parameter relates to selecting the correct bolt to torque in a prescribed sequence (e.g., for the cylinder head bolt of a 2012 GMC Sierra 1500 truck with the 5.3 liter v-8 engine). This may require a specific sequence and, when the smart tool 12 detects, for example, that the current bolt being tightened is (or is not) in sequence, the smart tool 12 can detect that the torquing operation it is within or (outside of) the specified tolerance. Subsequent actions that may be performed by the smart tool include any one of the following, without limitation: sounding an audible alarm, providing haptic/vibrational feedback in the smart tool handle, etc. Further, the smart tool application 40 may provide additional tutorial instructions on the electronic device 14, 20, e.g., in the form of a video. For example, the video may include a technician performing the steps of sequentially tightening the cylinder head bolts on the 2012 GMC Sierra 1500 w/5.3 liter v-8 engine. In another example embodiment, a live support person may be contacted via the electronic device 14, 20 or directly by accessing the network 16 to provide additional instruction to the operator. In such an example, the technician may explain to the operator the problems which could occur if the bolts are tightened 'out of sequence' (e.g. a coolant or vacuum leak in the cylinder head).

Figure 8:
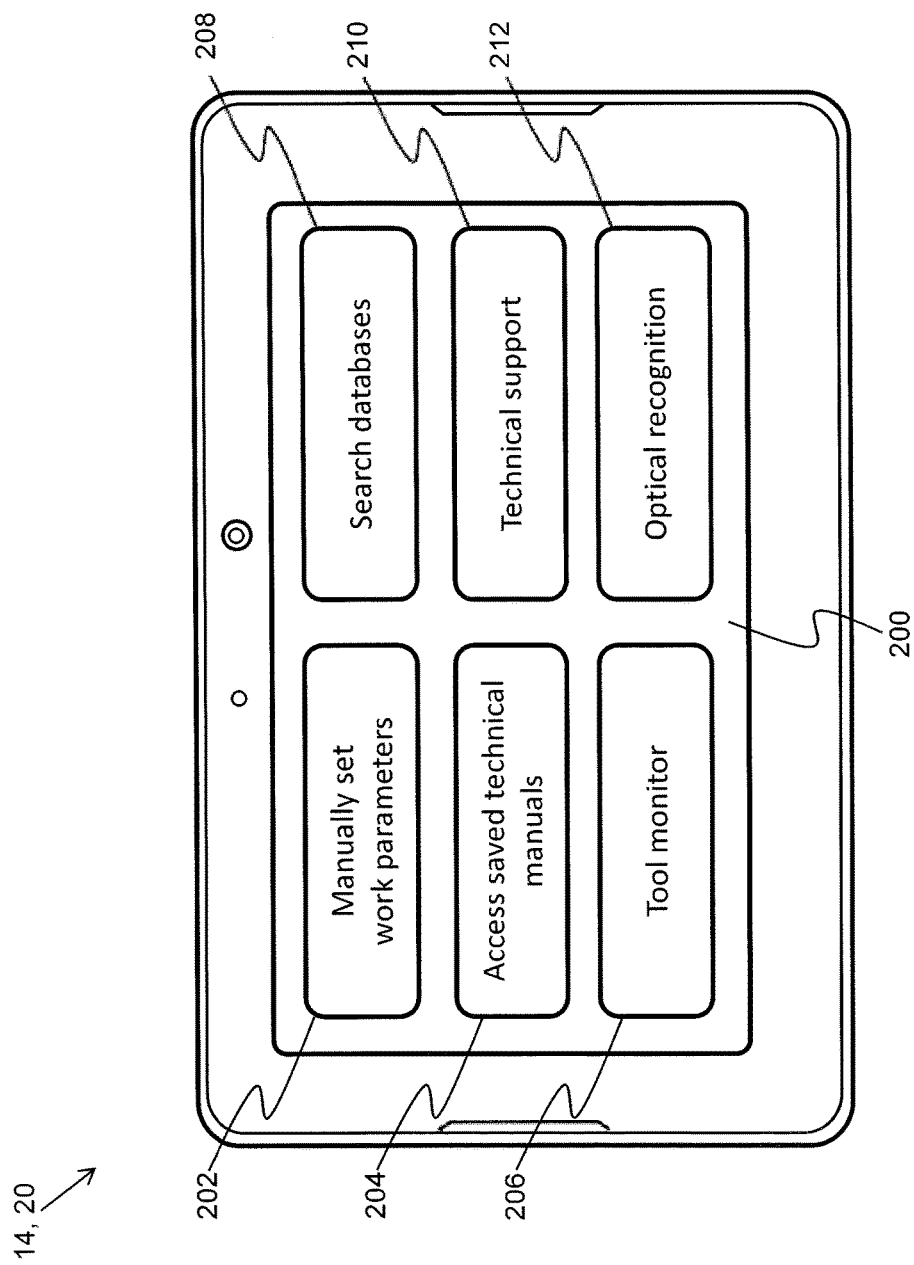
FIG. 8 is an example of a user interface that may be displayed using an electronic device communicating with a smart tool during operation thereof.

FIG. 8 illustrates an example of a user interface 200 displayed on an electronic device 14, 20 for assisting in operating a smart tool 12. In this example embodiment, the user interface provides various options, including: a first option 202 for manually setting the work parameter, a second option 204 for accessing technical manuals which are already saved in the memory of the electronic device 14, 20, a third option 206 for viewing the status information of the smart tool 12, a fourth option 208 for searching databases to find a work parameter, a fifth option 210 for contacting technical support, and a sixth option 212 for activating an optical recognition tool (e.g., on the smart tool 12 or the electronic device 14, 20). It can be appreciated that manually setting work parameters using the first option 202 provides the ability to establish operating assumptions of the smart tool 12. For example, to assume that all torque readings are in FT. LBS versus N. M, bolts are assumed to be regular "right-tighten", clockwise-tight threads, etc.

In the example embodiment wherein the smart tool 12 is, or includes, a wrench, the user may input the maximum amount of torque that can be applied using the smart tool 12 by manually setting work parameters using the first option (e.g., for a maximum torque value or threshold in FT-LBS.). When the maximum torque is reached, the smart tool 12 may produce a sound to alert the user that the maximum torque has been reached in order to prevent the object from being over-torqued. The user may also input a torque stepping sequence wherein the maximum torque that can be applied by the smart tool 12 is increased by user-specified increments at the end of each stage of a tightening process. In an example embodiment wherein the smart tool 12 or the working element 26 includes a motor, the presence of the motor can first be detected by the smart tool 12. The user may then be prompted to set the amount of torque to be applied by the motor of the smart tool 12. Alternatively, the user may input a torque profile which varies over time for more complex scenarios, or program an automatic torque stepping sequence e.g. as identified via the QR code affixed to the engine or workpiece 10.

The smart tool may also include an auto disengaging mechanism, which automatically disengages the working element 26 once the target work parameter has been met. The smart tool 12 may also include a haptic feedback module to be activated whenever the work element sensor 24 detects that the target work parameter has been met. When activated (e.g. the maximum torque parameter is reached), the haptic feedback module can be operated to vibrate and alert the operator that the target work parameter has been met.

The operator may view technical manuals that are already saved on the local storage of the external device by selecting the second option 204. This enables the user to view the library of manuals that are saved on the electronic device 14, 20 and select a desired manual.

The third option 206 enables the operator to view the current status of the smart tool 12. In one example embodiment, the tool monitor option 206, when selected, displays various information, such as a battery status of the smart tool 12, a type of working element 26 that is currently attached to the smart tool 12, current work parameter(s) being applied by the smart tool 12, etc. In another example embodiment, the tool monitor option 206 may include an option to display the historical values of work parameters that were applied by the smart tool 12 during previous uses. The tool monitor option 206 may also enable comments or work parameter settings/values of other smart tool operator/technicians to be shown, e.g., by accessing such information from the network 16.

Technical manuals prepared by the manufacturer can also be searched by selecting the fourth option 208. A database of such manuals can be searched using keywords or by selecting known specifications such as the manufacturer, the model, and the year of manufacture, etc. from drop-down menus. Optical recognition of the workpiece 10 may be utilized by selecting the sixth option 212, to identify the technical manual desired.

When the sixth option 212 is selected, the optical sensing module 60 on the smart tool 12 can be automatically activated. In one example embodiment, the optical sensing module 60 includes a camera that enables a still image of the UPC barcode associated with the workpiece 10 to be captured. Once the image is received by the smart tool application 40 residing on the electronic device 14, 20, an optical recognition tool residing on the electronic device 14, 20 can be used to process the image to automatically extract the UPC to be sent to a UPC database. In another example embodiment, the camera may capture a video clip or a still image of the workpiece 10, which is then processed by an optical recognition tool residing on the network 16 (e.g., by a third party system 18), to extract the necessary information for identifying the workpiece 10. The sixth option 212 may also be used to assist a technician in a live technical support session initiated by selecting the fifth option 210. For example, a video chat session may be initiated on the electronic device 14, 20, providing a split screen which has the technician (e.g. from GM) on one side, and the workpiece 10 as shown by the smart tool 12 on behalf of the operator, on the other.

Figure 9:
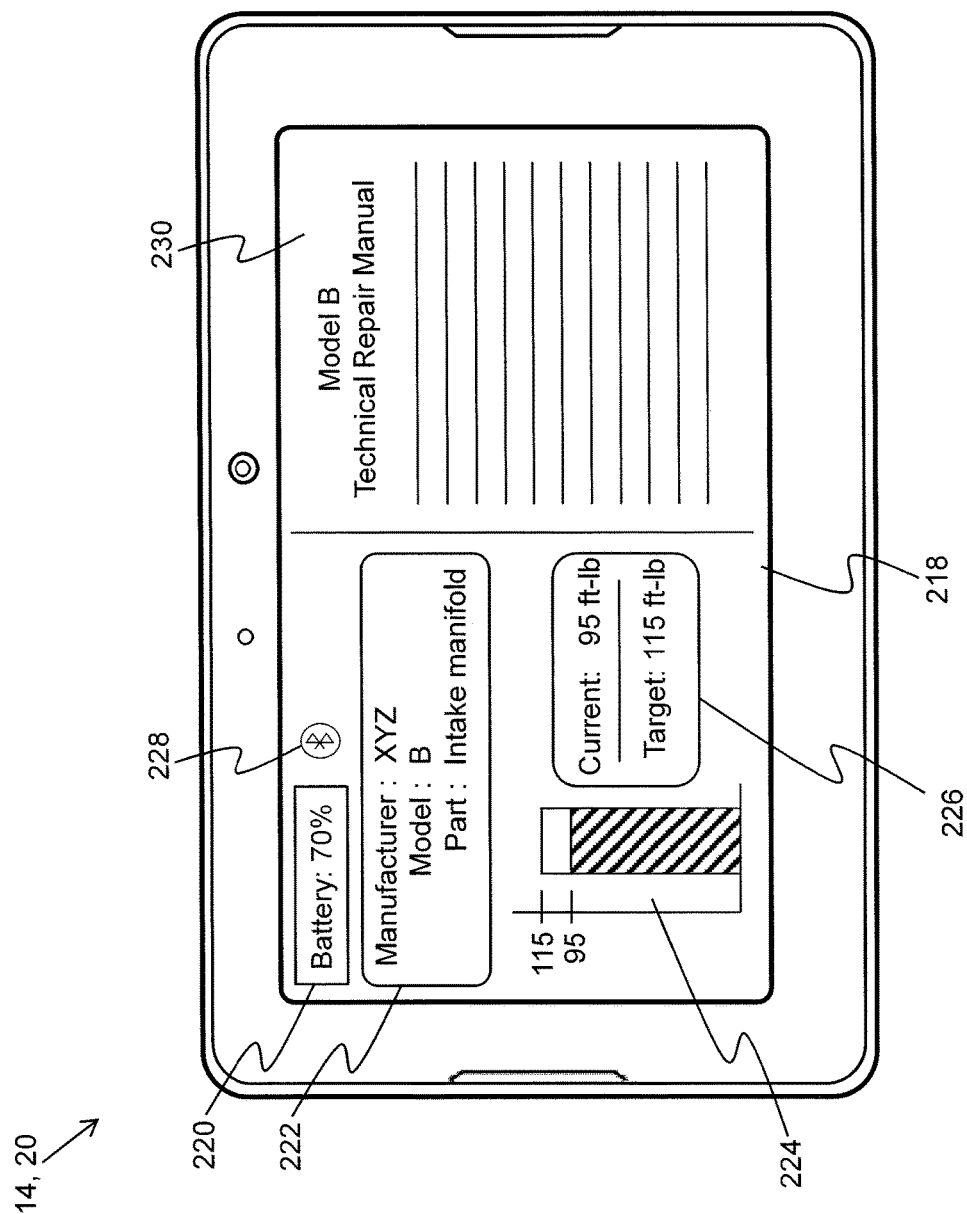
FIG. 9 is another example of a user interface that may be displayed using an electronic device communicating with a smart tool during operation thereof.

FIG. 9 illustrates a user interface 218 that may be displayed on an electronic device 14, 20 while interacting with the smart tool 12, e.g., after selecting the third option 206 (tool monitor as shown in FIG. 8). In this example, a battery status 220 of the smart tool 12 is displayed, along with a connection status 228. Information related to the workpiece 10 is displayed in portion 222, which includes manufacturer, model, and part descriptors in this example. Also shown is a current status 224, 226 of the smart tool 12, in this example using two different graphical elements, a bar chart 224, and numerical values 226. For example, wherein the smart tool 12 is a wrench 12' as shown in FIG. 4, the graphical representation 224 of the current torque being applied and the target torque that needs to be reached may be shown, and the numerical values 226 displayed adjacent this graphical representation 224. In addition, a relevant technical repair manual 230 can be displayed on a split portion of the user interface 218 for convenient reference. In another example, wherein the smart tool 12 is a caliper or measurement tool, current inside/outside diameters may be shown with an actual (e.g. image or live) view the smart tool 12 operator sees when holding the smart tool 12 to the workpiece 10.

Figure 10:
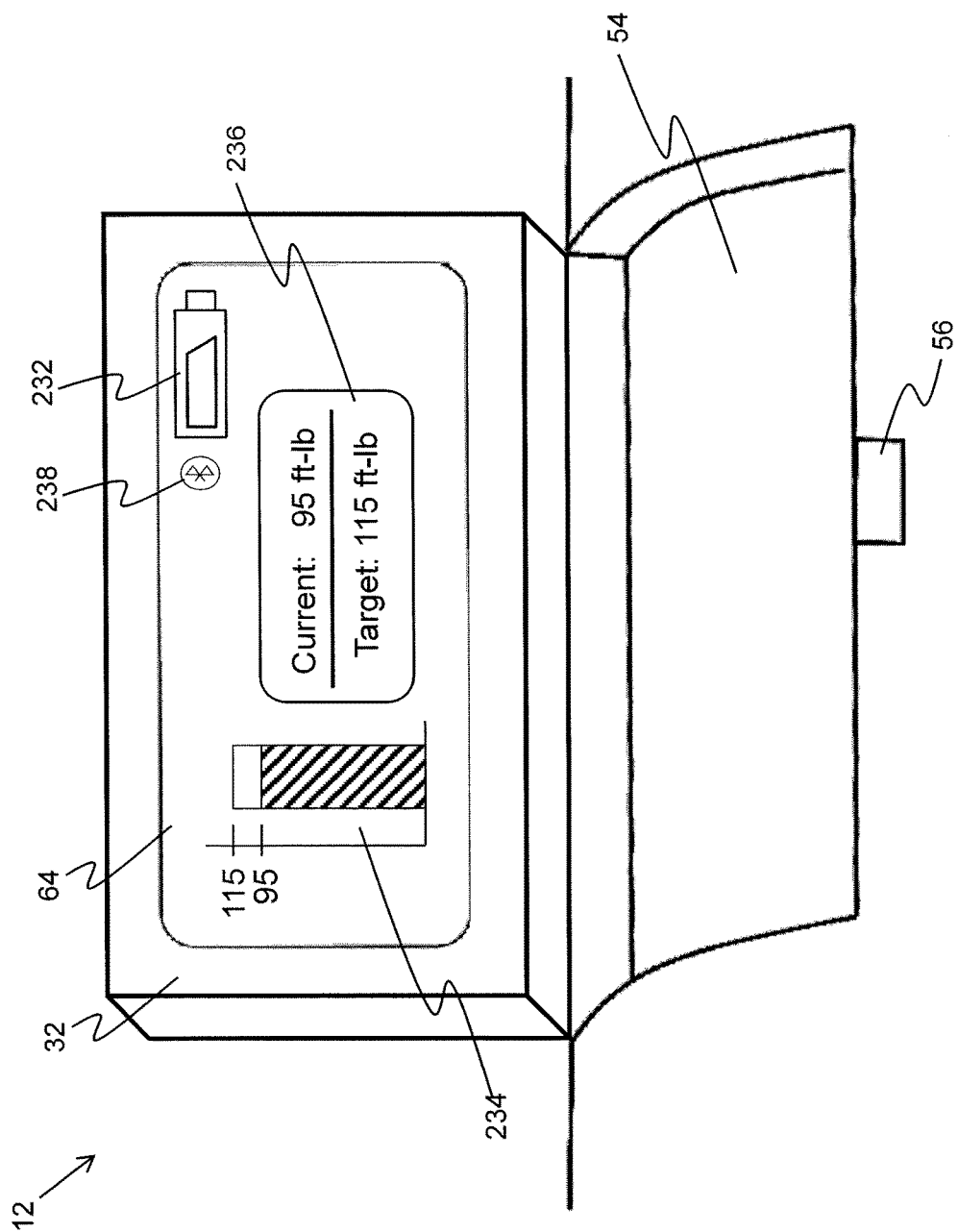
FIG. 10 is an example of a user interface that may be displayed by a smart tool during operation thereof.

FIG. 10 illustrates that the information displayed by the electronic device 14, 20 as shown in FIG. 9 can also or instead be displayed by the smart tool 12, e.g., on the first display 32a. In this example, a current torque being applied and the target torque to be reached are indicated using a graphical element 234 and numerical values 236, a connection status and connection type 238 (e.g. Bluetooth), and a battery status 232 of the smart tool 12 are also displayed. In another example embodiment, information transmitted from the smart tool application 40 residing on the electronic device 14, 20, such as specific torque values required for tightening the bolts on the workpiece according to the technical manual 130, may also be displayed.

Figure 11:
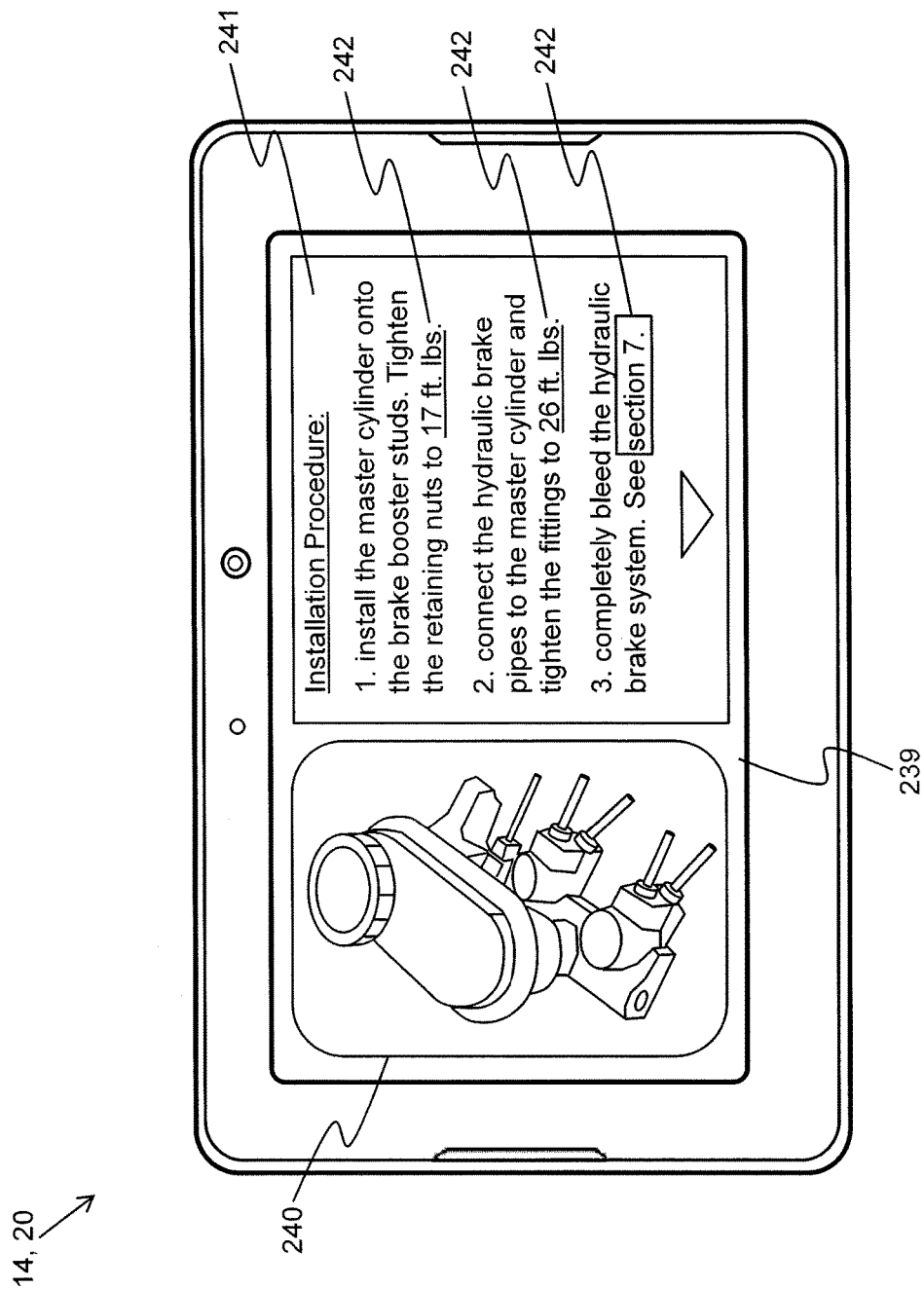
FIG. 11 is another example of a user interface that may be displayed using an electronic device communicating with a smart tool during operation thereof.

Referring now to FIG. 11, a smart manual user interface 239 is shown, which is displayed by the electronic device 14, 20. The smart manual user interface 239 in this example includes a written description or instruction 241 pertaining to the operations to be performed by the smart tool 12, an assembly, or operation of the workpiece 10, an element associated with each section of the description, or steps in instructions. The description or instruction 241 may dynamically insert appropriate values 242 associated with the elements or steps. For example, an instruction may read "connect the hydraulic brake pipes to the master cylinder and tighten the fittings to 26 ft. lbs." The associated element may be a picture of the master cylinder, and the value associated with the element may be 26 ft. lbs. as illustrated by way of example in FIG. 11.

In FIG. 11, the installation procedure for a master cylinder is displayed along with an image 240 of the master cylinder. The image 240 may be provided as an element associated with the set of instructions for installing the master cylinder, and the underlined torque values are the values associated with each step of the instruction. In one example embodiment, the smart tool application 40 may be operable to recognize which step of the instruction is being performed, and use this information to determine which target work parameter should be displayed on the smart tool 12. For example, the smart tool application 40 may access the optical sensing module 60 of the smart tool 12 to recognize that the retaining nuts have already been tightened, and the hydraulic brake pipes have been connected. Using this information, the smart tool application 40 determines that step two is being performed, and may transmit the torque value associated with step two to the smart tool 12 as well as highlight the torque value in the user interface 239.

In another example embodiment, the smart tool application 40 may recognize which step of the instruction is being performed and if, for example, the operator attempts to tighten a bolt using an incorrect target value of torque, the smart tool application 40 may alert the operator that the current target torque value may be incorrect, and suggest a new target value instead. The smart manual may also be modified or highlighted to direct the operator to a link to a different section of the smart manual or a website. A video showing the correct installation procedure may also be included directly in the user interface, or navigable by the operator (e.g., by touching a highlighted link on the touch-sensitive display of the electronic device 14, 20).

Accordingly, there is provided a first method comprising: obtaining a work parameter measured by a smart tool connected to an electronic device; and displaying information associated with the work parameter on a display of the electronic device.

There is also provided a second method comprising: measuring a work parameter associated with a smart tool operating on a workpiece; and sending the work parameter to an electronic device connected to the smart tool to enable the electronic device to display information associated with the work parameter on a display of the electronic device.

There is also provided a computer readable medium comprising computer executable instructions for performing the above methods.

There is also provided an electronic device comprising a processor, a communication interface, a display, and a memory, the memory storing computer executable instructions for performing the first method.

There is also provided a smart tool comprising a working element, at least one sensor coupled to the working element, a processor, a communication interface, and a memory, the memory storing computer executable instructions for performing the second method.

Figure 12:
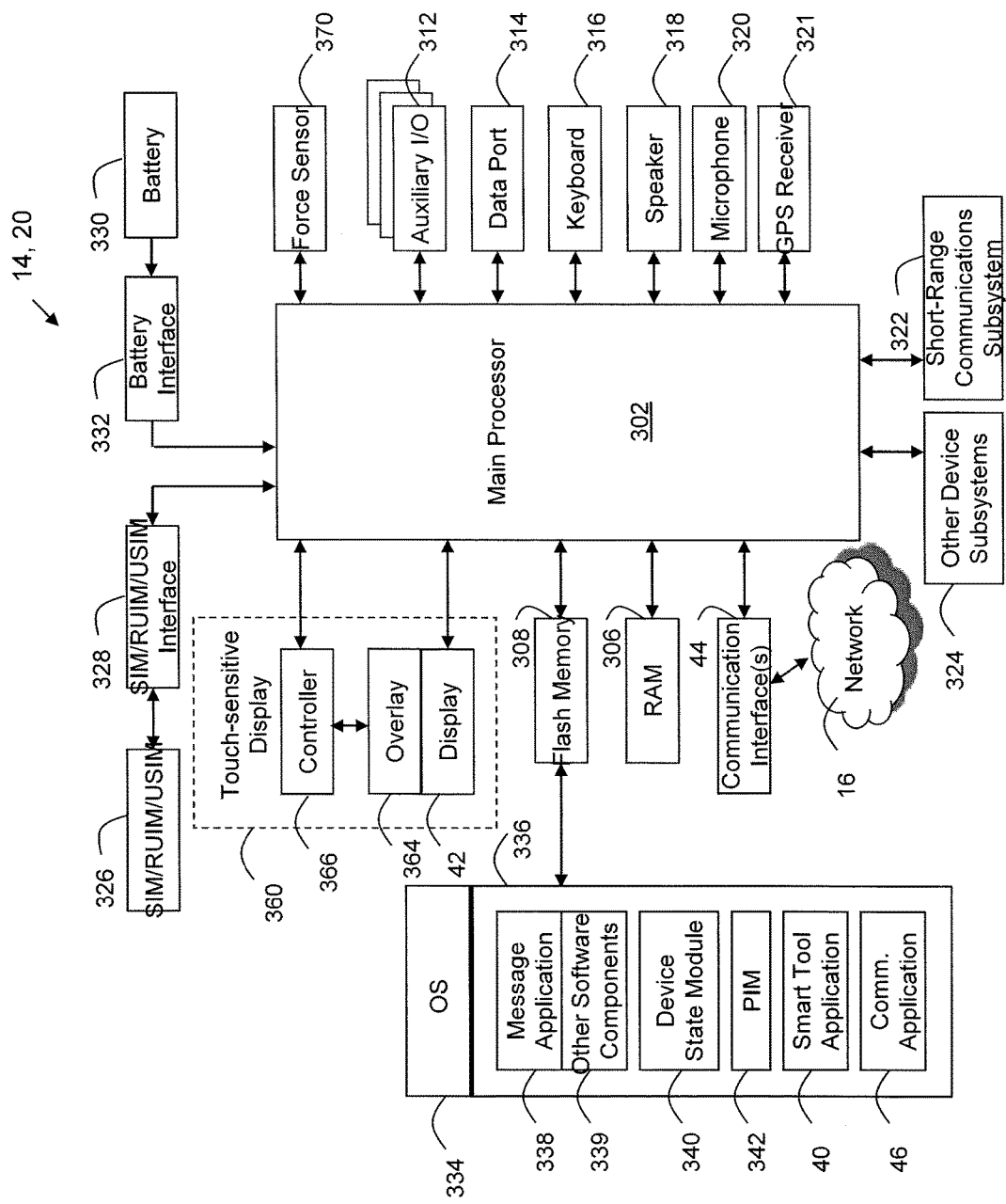
FIG. 12 is a block diagram of an example of an electronic device.

Referring to FIG. 12, to further aid in the understanding of the example electronic devices 14, 20 described above, shown therein is a block diagram of an example configuration of an electronic device 14, 20. The electronic device 14, 20 includes a number of components such as a main processor 302 that controls the overall operation of the electronic device 14, 20. Communication functions, including data and voice communications, are performed through one or more communication interfaces 44. The communication interface 44 receives messages from and sends messages to a network 16. In this example of the electronic device 14, 20, the communication interface 44 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 44 with the network 16 represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 360, an auxiliary input/output (I/O) subsystem 312, a data port 314, a keyboard 316 (physical, virtual, or both), a speaker 318, a microphone 320, a GPS receiver 321, short-range communications subsystem 322, and other device subsystems 324. Some of the subsystems of the electronic device 14, 20 perform communication-related functions, whereas other subsystems may provide "resident" or on-device functions. By way of example, the touch-sensitive display 360 and the keyboard 316 may be used for both communication-related functions, such as entering a text message for transmission over the network 16, and device-resident functions such as a calculator or task list. In one example, the electronic device 14, 20 can include a non-touch-sensitive display in place of, or in addition to the touch-sensitive display 360. For example the touch-sensitive display 360 can be replaced by a display 42 that may not have touch-sensitive capabilities.

The electronic device 14, 20 can send and receive communication signals over the network 16 (e.g. a wireless network) after required network registration or activation procedures have been completed. Network access is associated with a subscriber or user of the electronic device 14, 20. To identify a subscriber, the electronic device 14, 20 may use a subscriber module component or "smart card" 326, such as a Subscriber Identity Module (SIM), a Removable User Identity Module (RUIM) and a Universal Subscriber Identity Module (USIM). In the example shown, a SIM/RUIM/USIM 326 is to be inserted into a SIM/RUIM/USIM interface 328 in order to communicate with a network.

The electronic device 14, 20 is typically a battery-powered device and includes a battery interface 332 for receiving one or more rechargeable batteries 330. In at least some examples, the battery 330 can be a smart battery with an embedded microprocessor. The battery interface 332 is coupled to a regulator (not shown), which assists the battery 330 in providing power to the electronic device 14, 20. Although current technology makes use of a battery, future technologies such as micro fuel cells may provide the power to the electronic device 14, 20.

The electronic device 14, 20 also includes an operating system 334 and software components 336 to 342, 40, and 46. The operating system 334 and the software components 336 to 342, 40, and 46, that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 342, 40, and 46, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the electronic device 14, 20 during its manufacture. Software applications may include a message application 338, a device state module 340, a Personal Information Manager (PIM) 342, a smart tool application 40, and a communication application 46. A message application 338 can be any suitable software program that allows a user of the electronic device 14, 20 to send and receive electronic messages, wherein messages are typically stored in the flash memory 308 of the electronic device 14, 20. A device state module 340 provides persistence, i.e. the device state module 340 ensures that important device data is stored in persistent memory, such as the flash memory 308, so that the data is not lost when the electronic device 14, 20 is turned off or loses power. A PIM 342 includes functionality for organizing and managing data items of interest to the user, such as, but not limited to, e-mail, contacts, calendar events, and voice mails, and may interact with the network 16.

Other types of software applications or components 339 can also be installed on the electronic device 14, 20. These software applications 339 can be pre-installed applications (i.e. other than message application 338) or third party applications, which are added after the manufacture of the electronic device 14, 20. Examples of third party applications include games, calculators, utilities, etc.

The additional applications 339 can be loaded onto the electronic device 14, 20 through at least one of the wireless network 16', the auxiliary I/O subsystem 312, the data port 314, the short-range communications subsystem 322, or any other suitable device subsystem 324.

The data port 314 can be any suitable port that enables data communication between the electronic device 14, 20 and another computing device. The data port 314 can be a serial or a parallel port. In some instances, the data port 314 can be a Universal Serial Bus (USB) port that includes data lines for data transfer and a supply line that can provide a charging current to charge the battery 330 of the electronic device 14, 20.

For voice communications, received signals are output to the speaker 318, and signals for transmission are generated by the microphone 320. Although voice or audio signal output is accomplished primarily through the speaker 318, the display 42 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 42 of the touch-sensitive display 360 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 360. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 360. The location of the touch moves as the detected object moves during a touch. One or both of the controller 366 and the processor 302 may detect a touch by any suitable contact member on the touch-sensitive display 360. Similarly, multiple simultaneous touches, are detected.

In some examples, an optional force sensor 370 or force sensors is disposed in any suitable location, for example, between the touch-sensitive display 360 and a back of the electronic device 14, 20 to detect a force imparted by a touch on the touch-sensitive display 360. The force sensor 370 may be a force-sensitive resistor, strain gauge, piezoelectric or piezoresistive device, pressure sensor, or other suitable device.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the first electronic device 14, second electronic device 20, smart tool 12, third party system 18, etc., any component of or related thereto, or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method comprising:
   obtaining, from an optical sensor, an image of at least a portion of a workpiece;
   determining, at an electronic device, a workpiece identifier that is separate from a smart tool and associated with the workpiece with which the smart tool is interacting, the smart tool comprising a working element that interacts with the workpiece and further comprising the optical sensor, and wherein the workpiece identifier is identified based on optical recognition of the workpiece in the image;
   retrieving, from stored data that is separate from the workpiece and based on the workpiece identifier, a target work parameter for the working element of the smart tool when interacting with the workpiece;
   obtaining, from the smart tool after determining the workpiece identifier and retrieving the target work parameter, a measured work parameter measured by a working element sensor of the smart tool, the measured work parameter corresponding to the target work parameter and indicating at least one parameter associated with interaction of the working element with the workpiece;
   displaying, by the electronic device, the target work parameter and the measured work parameter;
   determining, by the electronic device, that the measured work parameter meets the target work parameter;
   sending, to the smart tool, an indication that the target work parameter has been met;
   receiving, based on the workpiece identifier determined based upon the image, smart manual data indicating a sequence of a plurality of steps to perform with the smart tool;
   receiving, from the smart tool, a sequence of images comprising the workpiece; and
   determining, based on the sequence of images and the smart manual data, a present step being performed by the smart tool, the present step being within the sequence of the plurality of steps,
      and wherein the target work parameter is determined based upon a specification in the smart manual associated with the present step.

2. The method of claim 1,
   wherein the workpiece identifier indicates an identification number of the workpiece, and
   wherein the target work parameter is retrieved based upon the identification number.

3. The method of claim 2, wherein retrieving the target work parameter comprises accessing a third party system via a network accessible to the electronic device, wherein the accessing comprises providing the workpiece identifier and receiving the target work parameter based on the workpiece identifier provided to the third party system.

4. The method of claim 1, further comprising receiving at least one specification for operating the smart tool.

5. The method of claim 4, wherein the specification comprises human readable operating instructions.

6. A non-transitory computer readable medium comprising computer executable instructions for performing the method of claim 1.

7. The method of claim 1, wherein the optical recognition of the workpiece comprises capturing information related at least one of a size or shape of the workpiece.

8. A method comprising:
   obtaining, by an optical sensor on a smart tool, an image of at least a portion of a workpiece;
   sending the image from the smart tool to an electronic device to enable optical recognition of the workpiece to be performed by the electronic device to determine one of a size of the workpiece, a shape of the workpiece, or a contour of the workpiece and used to obtain a target parameter associated with a target work parameter;
   receiving, at the smart tool via a communications link from the electronic device, the target work parameter;
   measuring, by the smart tool, a measured work parameter corresponding to the target work parameter, the measured work parameter indicating interaction between a working element of the smart tool and the workpiece;
   displaying, at the smart tool, the target work parameter and the measured work parameter;
   sending the measured work parameter from the smart tool to the electronic device connected to the smart tool via the communications link to enable the electronic device to display information associated with the target work parameter on a display of the electronic device;
   determining a workpiece identifier that is separate from a smart tool and associated with the workpiece with which the smart tool is interacting, the smart tool comprising a working element that interacts with the workpiece and further comprising the optical sensor, and wherein the workpiece identifier is identified based on optical recognition of the workpiece in the image;
   receiving, based on the workpiece identifier determined based upon the image, smart manual data indicating a sequence of a plurality of steps to perform with the smart tool;
   sending, from the smart tool, a sequence of images comprising the workpiece; and
   determining, based on the sequence of images and the smart manual data, a present step being performed by the smart tool, the present step being within the sequence of the plurality of steps,
      and wherein the target work parameter is determined based upon a specification in the smart manual associated with the present step.

9. The method of claim 8, further comprising receiving, from the electronic device based on sending the measured work parameter, an indication that the target work parameter has been met by the measured work parameter, the indication based on a comparison of the target work parameter and the measured work parameter.

10. The method of claim 9, further comprising providing feedback according to the indication.

11. The method of claim 8, further comprising displaying at least one of: at least a portion of information associated with the target work parameter, and the target work parameter, on a display of the smart tool.

12. The method of claim 8, further comprising receiving an instruction from the electronic device, and operating on the workpiece according to the instruction.

13. An electronic device comprising a processor, a communication interface, a display, and a memory, the memory storing computer executable instructions for performing:
- obtaining, from an optical sensor, an image of at least a portion of a workpiece;
- extracting, via optical recognition of the workpiece in the image, one of a size of the workpiece, a shape of the workpiece, or a contour of the workpiece;
- determining, by the processor based on the one of the size of the workpiece, the shape of the workpiece, or the contour of the workpiece, a workpiece identifier that is separate from the workpiece and is associated with the workpiece with which a smart tool is interacting, the smart tool comprising a sensor and an working element and further comprising an optical sensor;
- receiving, based on the workpiece identifier determined based upon the image, smart manual data indicating a sequence of a plurality of steps to perform with the smart tool;
- sending, from the smart tool, a sequence of images comprising the workpiece; and
- determining, based on the sequence of images and the smart manual data, a present step being performed by the smart tool, the present step being within the sequence of the plurality of steps;
- retrieving, from stored data that is separate from the workpiece and based on the workpiece identifier, a target work parameter for the working element of the smart tool when interacting with the workpiece, and wherein the target work parameter is determined based upon a specification in the smart manual associated with the present step;
- obtaining, via the communications interface from the smart tool after determining the workpiece identifier and retrieving the target work parameter, a measured work parameter measured by a working element sensor of the smart tool, the measured work parameter corresponding to the target work parameter and indicating at least one parameter associated with interaction of the working element with the workpiece;
- displaying, on the display, the target work parameter and the measured work parameter;
- determining, by the processor, that the measured work parameter meets the target work parameter; and
- sending, via the communications interface to the smart tool, an indication that the target work parameter has been met.

14. A smart tool comprising a working element, at least one sensor coupled to the working element, a processor, a communication interface, and a memory, the memory storing computer executable instructions for performing:
- obtaining, by a sensor on a smart tool, an image of at least a portion of a workpiece;
- sending the image from the smart tool to an electronic device to enable optical recognition of the workpiece to be performed by the electronic device and used to obtain a target parameter associated with a target work parameter;
- receiving, at the smart tool via a communications link from the electronic device, the target work parameter;
- measuring, by the smart tool, a measured work parameter corresponding to the target work parameter, the measured work parameter indicating interaction between a working element of the smart tool and the workpiece;
- displaying, at the smart tool, the target work parameter and the measured work parameter;
- sending the measured work parameter from the smart tool to the electronic device connected to the smart tool via the communications link to enable the electronic device to display information associated with the target work parameter on a display of the electronic device;
- receiving, based on sending the image, smart manual data indicating a sequence of a plurality of steps to perform with the smart tool;
- receiving a sequence of images comprising the workpiece; and
- determining, based on the sequence of images and the smart manual data, a present step being performed by the smart tool, the present step being within the sequence of the plurality of steps,
    - and wherein the target work parameter is determined based upon a specification in the smart manual associated with the present step.

* * * * *